United States Patent [19]
Sullivan

[11] 3,848,882
[45] Nov. 19, 1974

[54] RING CHUCKING APPARATUS

[76] Inventor: Edward F. Sullivan, 4465 Bradford St., Saginaw, Mich. 48603

[22] Filed: Nov. 20, 1972

[21] Appl. No.: 308,178

[52] U.S. Cl. ............ 279/4, 279/1 E, 279/2 A, 279/110, 408/68, 82/9
[51] Int. Cl. .............. B23b 31/10, B23b 31/30
[58] Field of Search ........... 279/2 A, 4, 110, 1 E; 82/91, 101, 102; 29/156.2, 156.3; 408/68

[56] References Cited
UNITED STATES PATENTS

| | | | |
|---|---|---|---|
| 926,761 | 7/1909 | Oliver | 279/1 E |
| 2,373,907 | 4/1945 | Olson | 82/91 |
| 2,826,420 | 3/1958 | Klinger | 279/4 |

*Primary Examiner*—Francis S. Husar
*Attorney, Agent, or Firm*—Learman & McCulloch

[57] ABSTRACT

Apparatus for chucking a piston ring and the like, which is to be axially divided into two ring parts by a cutting blade at a cutting station, including a rotatable, ring holding chuck assembly, having a plurality of circumferentially spaced, chuck jaws, each movable between a radially inner, ring receiving and releasing position in which an undivided ring is initially received and ring parts are subsequently discharged, and a radially outer ring gripping position. The chucking apparatus includes an inflatable, jaw moving bag having a portion disposed radially inwardly of the chuck jaws for moving the jaws to the radially outer positions in which they grip and hold a ring when the bag is inflated. Each of the chuck jaws includes axially spaced, independently radially movable, ring gripping jaw portions separated by a gap for receiving a radially movable, ring cutting blade after the blade has passed radially through the ring.

13 Claims, 2 Drawing Figures

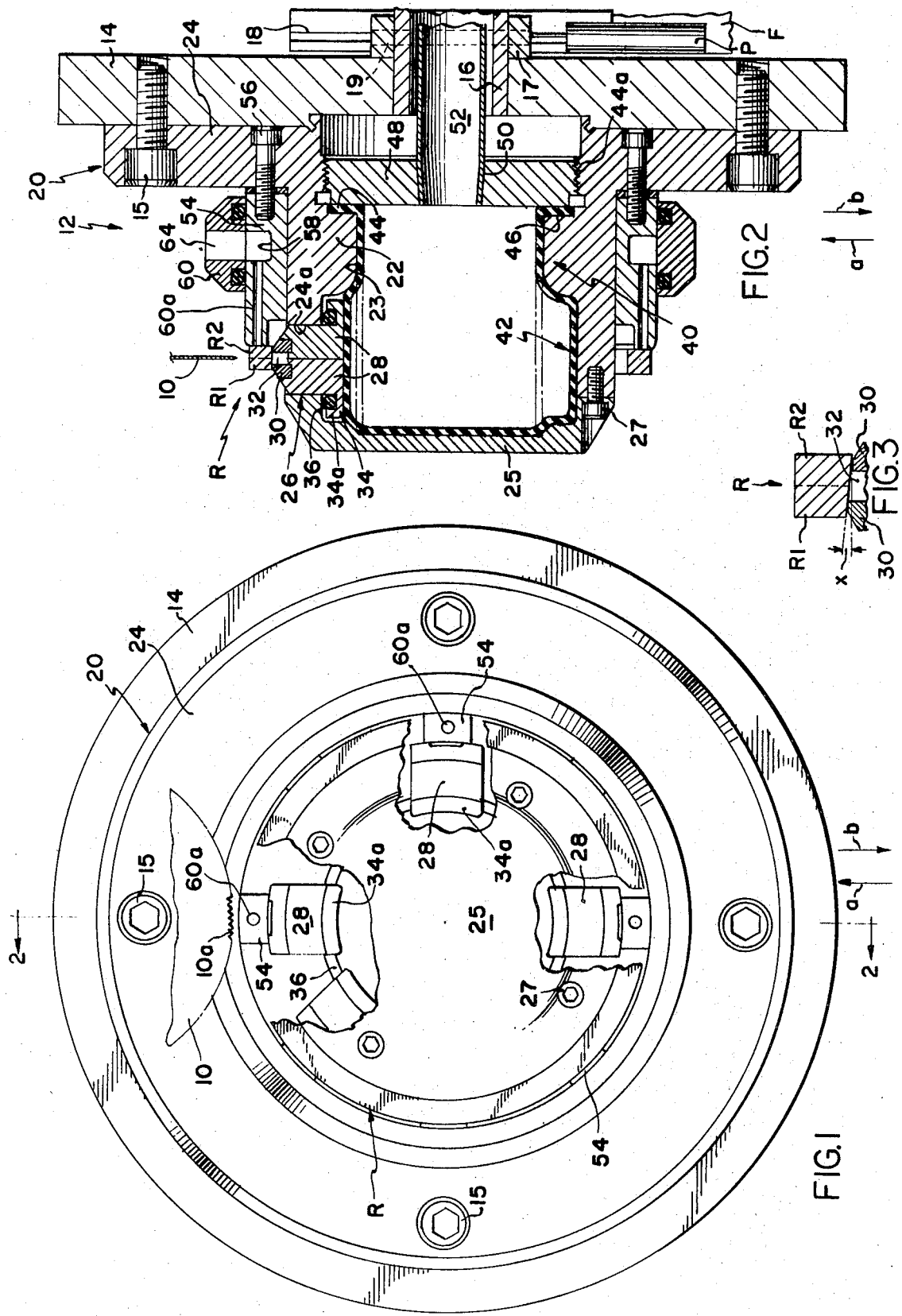

3,848,882

RING CHUCKING APPARATUS

BACKGROUND OF THE INVENTION

This invention relates to ring chucking apparatus, and more particularly to a new and improved fluid operated, ring holding, chuck assembly which will automatically adjust for diametrical variations in out-of-round rings and will exert substantially uniform radial holding force on circumferentially spaced, varying diameter portions of the ring.

The casting of axially thin, automobile engine piston rings frequently results in a high number of rings being broken during the casting process. The incidence of breakage is decreased by initially casting piston rings of increased axial length and then axially dividing each ring into at least two ring parts, each having the desired axial length. Accordingly, it is an object of the present invention to provide apparatus for axially dividing a piston ring or the like, into two ring parts.

It is another object of the present invention to provide ring chucking apparatus with chuck jaws which are forced radially outwardly into engagement with the radially inner surface of the ring, and to axially divide the chucked ring by progressively cutting it with a blade which moves in a radially inwardly directed cutting path of travel.

It is another object of the present invention to provide ring chucking apparatus including a plurality of ring holding, radially movable chuck jaws, each including radially outer, ring holding chuck jaw portions which engage the inner surfaces of the ring and are separated by an axial gap that receives a radially inwardly movable ring cutting tool.

It is important that each chuck jaw exerts substantially the same holding pressure on the ring. When out-of-round rings are to be divided, the ring gripping jaws must be radially moved different distances to exert equal holding pressure on the diametrically varying portions of the ring. Accordingly, it is an object of the present invention to provide ring chucking apparatus including a new and improved ring holding chuck assembly having radially movable chuck holding jaws and a fluid expansible bag which moves the jaws between radially inner ring receiving positions and radially outer ring clamping positions engaging the interior surface of a ring to be divided.

Casting tolerances are generally quite large and the radially inner ring bore may be axially tapered so that the ring bore has a smaller diameter at one end of the ring than the other. In spite of this, it is important that the chuck exert substantially the same holding pressure on axially opposite end portions of the ring so that when the ring is divided into two ring parts, the two ring parts will be held firmly until the cutting is completed and the chuck is released.

It is yet another object of the present invention to provide a ring chucking apparatus including a plurality of circumferentially spaced jaws each including a pair of axially aligned, independently radially movable, ring holding jaw portions which engage axially opposite ends of a ring to be divided.

Another object of the present invention is to provide a ring holding chuck assembly which includes radially movable, ring gripping jaws and an inflatable bag that will expand to radially outwardly move the jaws different distances to exert substantially the same holding pressure on perimetrically spaced portions of out-of-round rings.

Another object of the present invention is to provide a ring holding chuck assembly, of the type described, which will exert substantially uniform, radially outwardly directed holding pressures on axially spaced, varying diameter portions of an out-of-round piston ring.

Other objects and advantages of the present invention will become apparent to those of ordinary skill in the art as the description thereof proceeds.

SUMMARY OF THE INVENTION

Ring chucking apparatus for holding a piston ring and the like, to be axially divided into two ring parts, comprising: a support body; a plurality of circumferentially spaced ring holding chuck jaws mounted on the body for radial movement between radially outer, ring holding positions engaging the inner portions of a piston ring to be divided, and radially inner, ring receiving and releasing positions in which undivided rings are initially received, and divided ring parts are subsequently discharged, each of the chuck jaws including radially outer, axially aligned jaw portions, engageable with axially opposite end portions of a ring to be cut and separated by a gap. Radially expansible and contractible means are disposed radially inwardly of the chuck jaws and are movable between collapsed and expanded conditions for moving the chuck jaws between the radially inner, inoperative positions and radially outer ring clamping positions. Means is provided for selectively communicating fluid to and from the expandable and contractible means to move it between the collapsed and expanded conditions and move the chuck jaws between the radially inner, inoperative position and radially outer ring clamping positions.

The present invention may more readily be understood by reference to the accompanying drawings, in which:

FIG. 1 is an end elevational view of ring dividing apparatus incorporating a ring chucking assembly constructed according to the present invention, part of the end cap of the ring chucking assembly being broken away to more clearly illustrate the ring gripping chuck jaws;

FIG. 2 is a vertical sectional view, taken along the line 2—2 of FIG. 1; and

FIG. 3 is an enlarged sectional view of a ring to be divided.

DESCRIPTION OF THE PREFERRED EMBODIMENT

Ring chucking apparatus, constructed according to the present invention and generally designated 12, is mounted on a frame F and is particularly adapted for holding a cast metal ring R and moving it in a to-and-fro path of travel, represented by the arrows $a$ and $b$, into and out of cutting engagement with a circular saw blade 10, stationarily mounted on the frame F. The saw blade 10 includes circumferential cutting teeth 10a, for dividing the ring R into two ring parts R1 and R2 (FIG. 2). The ring chucking apparatus, generally designated 12, includes a circular face plate 14 fixed to a rotatable spindle 16 journaled in a carriage, schematically designated 17. The carriage 17 includes a dovetail slide 19, received in a complemental groove 18 in the frame F for sliding movement in the to-and-fro path, represented by the arrows a and b, by a frame supported double acting, solenoid actuated, fluid pressure operated cylinder P.

The ring chucking apparatus 12 includes a chuck holding body, generally designated 20, having an axially extending cylinder portion 22 defining an axial passage 23, and an annular mounting plate portion 24 removably secured to the face plate 14 by bolts 15. The axially outer end of the cylindrical chuck body portion 22 includes a plurality of circumferentially spaced, axially open ended, radially extending slots 24a closed by an axial end cap 25 which is bolted to the end of cylindrical chuck body portion 22 by bolts 27.

The radial slots 24a communicate with the axial passage 23, and receive a plurality of circumferentially spaced, axially split, ring holding chuck jaws, generally designated 26. The chuck jaws 26 each include a pair of identical, independently radially movable, chuck jaw members 28, in axially confronting, radial sliding engagement, mounting radially outer locator pads 30 which engage the radially inner portions of a ring R to be divided. The pair of locator pads 30 on each chuck jaw 26 are axially separated by a gap 32 for receiving the cutting blade 10 after the carriage 17 has moved in the direction of the arrow a and the cutting blade 10 has cut radially through a ring R to split the ring into two ring parts R1 and R2.

The chuck jaw members 28 of each chuck jaw 26 include axial flanges 34, having upturned lips 34a, which receive constricting, rubber O-ring members 36 that bias the chuck jaw members 28 to the radially inner positions illustrated in chain lines (FIG. 2).

Apparatus for moving the chuck jaws 26 between the radially inner, ring-receiving and ring-releasing positions and radially outer ring clamping positions, is generally designated 40 and includes an inflatable rubber bag, generally designated 42, having an integral, annular mounting flange 44, axially clamped against a shoulder 46 on the cylindrical chuck body portion 22 by a clamping plate or ring 48 threaded into an enlarged diameter portion 44a of the cylindrical chuck body 20. The clamping plate 48 includes a passage 50 therein for receiving a pipe 52 communicating with a source of hydraulic fluid which expands the inflatable bag 42 between the radially inner deflated position, illustrated in chain lines (FIG. 2) and the radially outer position, illustrated in solid lines in FIG. 2, to move the chucks 26 to the radially outer ring clamping positions.

When elliptical ring R, for example those being 1/8 inch out-of-round, are to be axially divided, the expanding bag 42 will move those chuck jaws 26 which hold the larger diameter portions of the ring radially outwardly a greater distance than the remaining chuck jaws, so that the ring R is held with substantially equal pressure at all chuck jaw positions. Similarly, if the ring is cast with an internal draft angle x (FIG. 3) so that the internal diameter of one ring part R1, for example, is slightly greater than the internal diameter of the ring part R2, the chuck jaw members 28 in engagement with the ring part R1 will move radially outwardly a greater distance than the axially aligned chuck jaw members 28 engaging the ring part R2 to hold both end portions of the ring R with substantially equal force. This will insure that the ring parts R1 and R2 will be firmly held after the ring R is divided by the cutting blade 10.

Apparatus is also provided for axially removing the ring parts R1 and R2 from the locator pads 30 after the ring R has been divided and comprises an annular air manifold 54, fixed to the chuck body mounting flange 24 by bolts 56, including an annular slot 58 covered by a sealing ring 60 having a supply port 64 communicating with the slot 58 and a source of ejecting air (not shown). A plurality of axially extending passages 60a, communicating with the slot 58, direct the ejection air against the side of the ring part R2 to move it in an axially outward path of travel away from the chuck jaws 26 when the chuck jaws 26 have been moved to their radially inner, ring releasing positions.

THE OPERATION

A ring R is moved to the position, illustrated in FIG. 2, overlying the chuck jaws 28, and hydraulic fluid is admitted through the fluid supply pipe 52 to expand the inflatable bag 42 from the radially inner position, illustrated in chain lines in FIG. 2, to the radially outer position illustrated in solid lines in FIG. 2, to move the chuck jaws 26 to the radially outer positions illustrated in FIG. 2 so that the locating pads 30 engage axially and circumferentially spaced interior portions of the ring R and firmly hold the ring. The spindle 16 is rotated and the slide 17 is moved in the direction of the arrow a toward the stationary saw blade 10 which cuts through the rotating ring R in a radially inwardly directed path of travel to be received in the gap 32 between the locating pads 30. The slide 17 is retracted and the hydraulic fluid in the bag 42 is withdrawn to deflate the bag and permit the chuck jaws 26 to be returned to their radially inner ring releasing positions by the constricting rings 36. Ejection air is admitted to the port 64 to axially drive the ring parts R1 and R2 from the locator pads 30. The operation can then be repeated.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

I claim:

1. Ring chucking apparatus for holding piston rings and the like, to be axially divided into at least two ring parts by a cutting blade at a ring cutting station, comprising:

a support body;

a plurality of circumferentially spaced, ring holding chuck jaws mounted on each body for movement between radially inner, ring receiving and releasing positions in which an undivided ring is received and divided ring parts are released, and radially outer ring gripping positions, each of said chuck jaws including a pair of axially spaced independently movable jaw portions, engageable with axially opposite end portions of a ring to be divided, said jaw portions being separated by an axial gap for receiving the cutting blade after it has cut a ring into two ring parts; and radially expansible and contractible means, movable between collapsed and expanded conditions, for moving said chuck jaw portions between said radially inner ring receiving and releasing positions and said radially outer ring clamping positions.

2. The apparatus set forth in claim 1 wherein said expansible and contractible means includes inflatable and deflatable means disposed radially inwardly of said chuck jaws and movable between collapsed and inflated conditions, and means for selectively introducing fluid to and removing it from the said inflatable and deflatable means to move it between said collapsed and inflated conditions and move said chuck jaws between said radially inner and radially outer positions.

3. The apparatus set forth in claim 2 wherein said expansible and contractible means includes means normally biasing said chuck jaws to said radially inner positions.

4. The apparatus set forth in claim 3 wherein said inflatable and deflatable means comprises an inflatable bag having an integrally formed, annular mounting flange; clamp means is provided for axially clamping said flange to said body; and fluid conduit means is disposed in said clamp means radially inwardly of said flange in fluid communicating relation with said bag.

5. The apparatus set forth in claim 1 including means for axially ejecting the divided ring parts from the chuck jaws when said chuck jaws are in said radially inner positions.

6. The apparatus of claim 5 wherein said ejecting means comprises means for selectively directing pressurized fluid in an axial path toward said ring parts and away from said holding means.

7. The apparatus of claim 3 wherein said means for biasing said jaw means to said radially inner positions comprises annular yieldable means reacting between said jaw means.

8. A chuck for holding rings to be divided into at least two ring parts comprising:
a chuck body having an axial passage therein and a plurality of circumferentially spaced radial passages communicating with said axial passage;
a plurality of circumferentially spaced jaw means mounted in said radial passages for movement between radially inner, ring receiving and releasing positions, in which an undivided ring is received and divided ring parts are released, and radially outer, ring clamping positions, each of said jaw means comprising a pair of independently radially movable jaw members for gripping axially opposite end portions of a ring;
expansible and contractible means, including a portion disposed in said axial passage, for moving said jaw means between said radially inner positions and said radially outer positions.

9. The apparatus of claim 8, wherein said expansible and contractible means comprises means biasing said jaw means to said radially inner positions; inflatable and deflatable means; and means for inflating and deflating said inflatable and deflatable means to move said jaw means to said radially outer positions against the resistance of said biasing means to selectively grip a ring.

10. The chuck set forth in claim 8 wherein the radially outer portions of said jaw members are spaced from each other by an axial gap.

11. The chuck set forth in claim 10 wherein said biasing means comprises resilient means reacting between said jaw means to normally move said jaw means radially inwardly.

12. The chuck set forth in claim 11 including means for axially ejecting a ring from the chuck jaws when the chuck jaws are moved to their radially inner, ring releasing positions.

13. Ring chucking apparatus for holding piston rings and the like, to be axially divided into at least two ring parts by a cutting blade at a ring cutting station, comprising:
a support body;
a plurality of circumferentially spaced, ring holding chuck jaws mounted on said body for movement between radially inner, ring receiving and releasing positions in which an undivided ring is received and divided ring parts are released, and radially outer ring gripping positions;
inflatable and deflatable means, disposed radially inwardly of said chuck jaws, radially movable between collapsed and inflated conditions, for moving said chuck jaws between said radially inner ring receiving and releasing positions and said radially outer ring clamping positions;
means for selectively introducing fluid to and removing it from said inflatable and deflatable means to move it between said collapsed and inflated conditions and move said chuck jaws between said radially inner and radially outer positions;
said inflatable and deflatable means comprising an inflatable bag having an integrally formed, annular mounting flange;
clamp means for axially clamping said flange to said body; and
fluid conduit means disposed in said clamp means radially inwardly of said flange in fluid communicating relation with said bag.

* * * * *